United States Patent
Yang

(10) Patent No.: US 10,429,016 B1
(45) Date of Patent: Oct. 1, 2019

(54) LED LIGHT STRING WITH STABLE CURRENT

(71) Applicant: Chen-Sheng Yang, Kaohsiung (TW)

(72) Inventor: Chen-Sheng Yang, Kaohsiung (TW)

( * ) Notice: Subject to any disclaimer, the term of this patent is extended or adjusted under 35 U.S.C. 154(b) by 0 days.

(21) Appl. No.: 16/128,918

(22) Filed: Sep. 12, 2018

(51) Int. Cl.
   *H05B 33/08* (2006.01)
   *F21S 4/10* (2016.01)
   *F21V 23/02* (2006.01)
   *F21V 23/00* (2015.01)

(52) U.S. Cl.
   CPC .............. *F21S 4/10* (2016.01); *F21V 23/007* (2013.01); *F21V 23/023* (2013.01); *H05B 33/0842* (2013.01)

(58) Field of Classification Search
   CPC ...... F21S 4/10; H05B 33/0842; F21V 23/023; F21V 23/007
   See application file for complete search history.

(56) References Cited

U.S. PATENT DOCUMENTS

| | | | |
|---|---|---|---|
| 2016/0050739 A1* | 2/2016 | Janning | H05B 39/09 |
| | | | 315/122 |
| 2016/0143099 A1* | 5/2016 | Ding | H05B 33/089 |
| | | | 315/122 |
| 2016/0323941 A1* | 11/2016 | Yu | H05B 33/0803 |

\* cited by examiner

*Primary Examiner* — Tracie Y Green
(74) *Attorney, Agent, or Firm* — Tracy M Heims; Apex Juris, PLLC.

(57) ABSTRACT

An LED light string has a plug, a socket, a lighting string connected between the plug and the socket, and a control circuit provided in either the plug or the socket. The control circuit uses at least one current controller to control a driving current flowing through the lighting string stably. When a temperature of the lighting string exceeds a threshold, the current controller activates its over-temperature protection function to lower the driving current. When short-circuit occurs on the lighting string, the current controller activates its short-circuit protection function to lower the driving current.

20 Claims, 8 Drawing Sheets

LED LIGHT STRING WITH STABLE CURRENT

BACKGROUND OF THE INVENTION

1. Field of the Invention

The present invention relates to an LED light string, and more particularly to an LED light string having a control circuit provided in either a head plug or a tail socket to supply a stable driving current.

2. Description of the Prior Arts

With reference to FIG. 8, a conventional LED light string may have a plug 71, a socket 72 and an LED string 73 connected between the plug 71 and the socket 72. Both the plug 71 and the socket 73 need to connect to three wires, i.e. two power wires 74a, 74b and wires of the LED string 73.

Since the LED light string has no over-temperature protection function, when the temperature of the LED string 73 exceeds a certain value or a short-circuit occurs on the LED string 73, the entire LED light string may be burned out. Further, when the driving current applied to the LED string 73 is unstable, the driving current may cause flickering problems.

SUMMARY OF THE INVENTION

The main objective of the present invention is to provide an LED light string with a stable current.

To accomplish this objective, the LED light string comprises:
a lighting string having a positive end and a negative end, wherein the lighting string comprises a plurality of light emitting diodes connected in series between the positive end and the negative end;
a plug and a socket, wherein the plug is connected to the positive end or the negative end of the lighting string while the socket is connected to the negative end or the positive end of the lighting string;
a control circuit provided in either the plug or the socket, the control circuit comprising:
a power converting unit for converting an input power to a DC power; and
a power output end connected to the positive end of the lighting string; and
at least one current controller receiving the DC power and outputting a driving current from the power output end;
a first wire connected between the plug and the socket; and
a second wire having a first end connected to the negative end of the lighting string and a second end connected to the plug or the socket that has the control circuit therein.

DETAILED DESCRIPTION OF THE PREFERRED EMBODIMENTS

Figure 1:
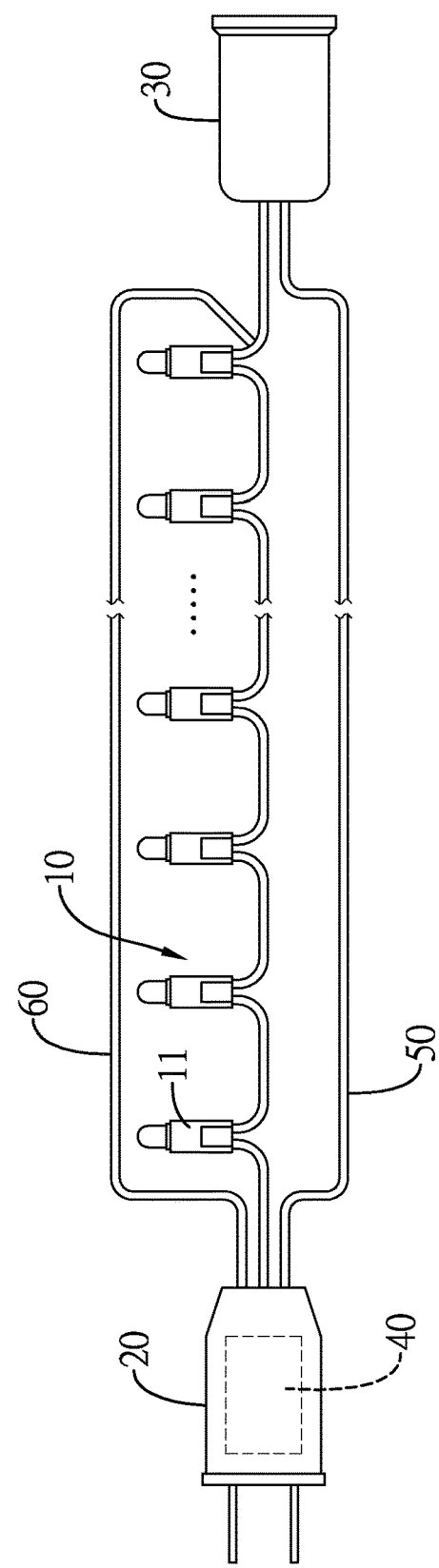
FIG. 1 is a plan view of a first embodiment of an LED light string in accordance with the present invention.
Figure 3:
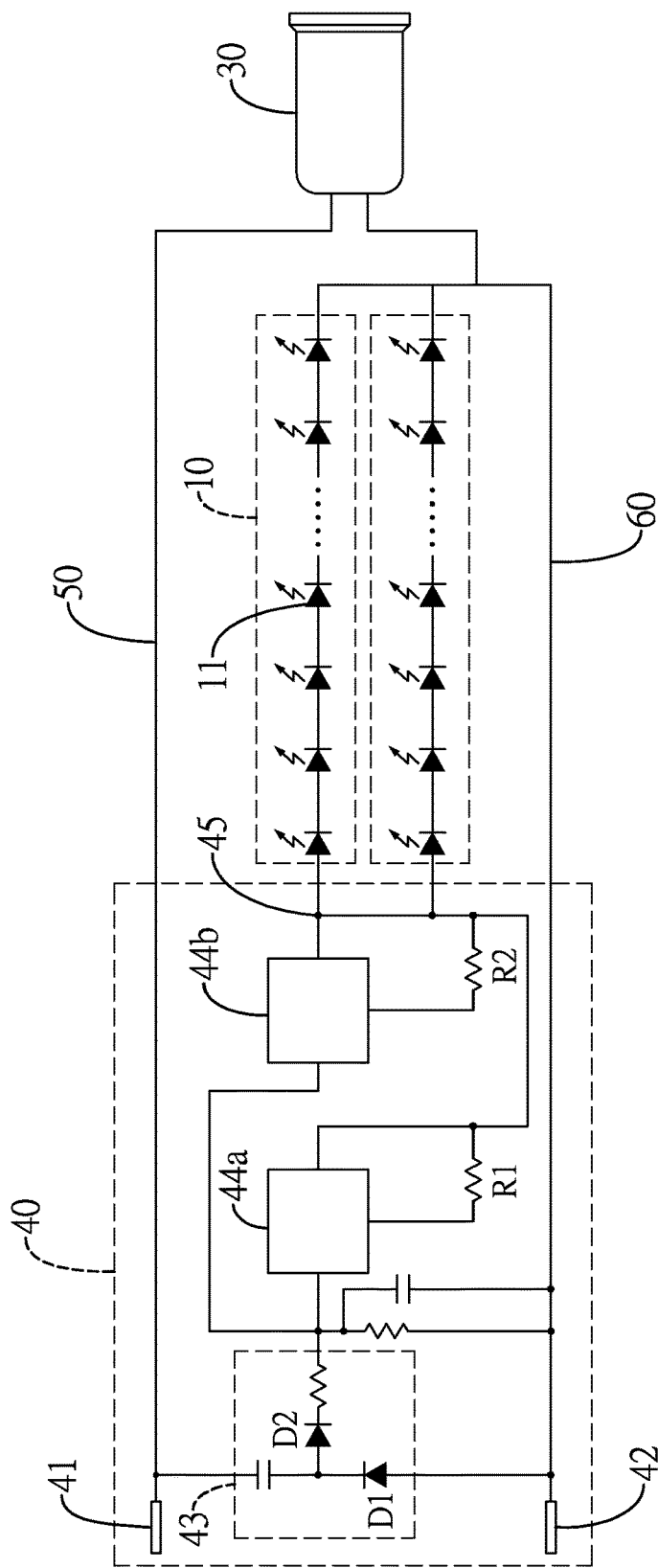
FIG. 3 is a second circuit embodiment of the LED light string of FIG. 1.

With reference to FIGS. 1 and 3, an LED light string comprises a lighting string 10, a plug 20, a socket 30, a control circuit 40, a first wire 50 and a second wire 60.

Figure 2:
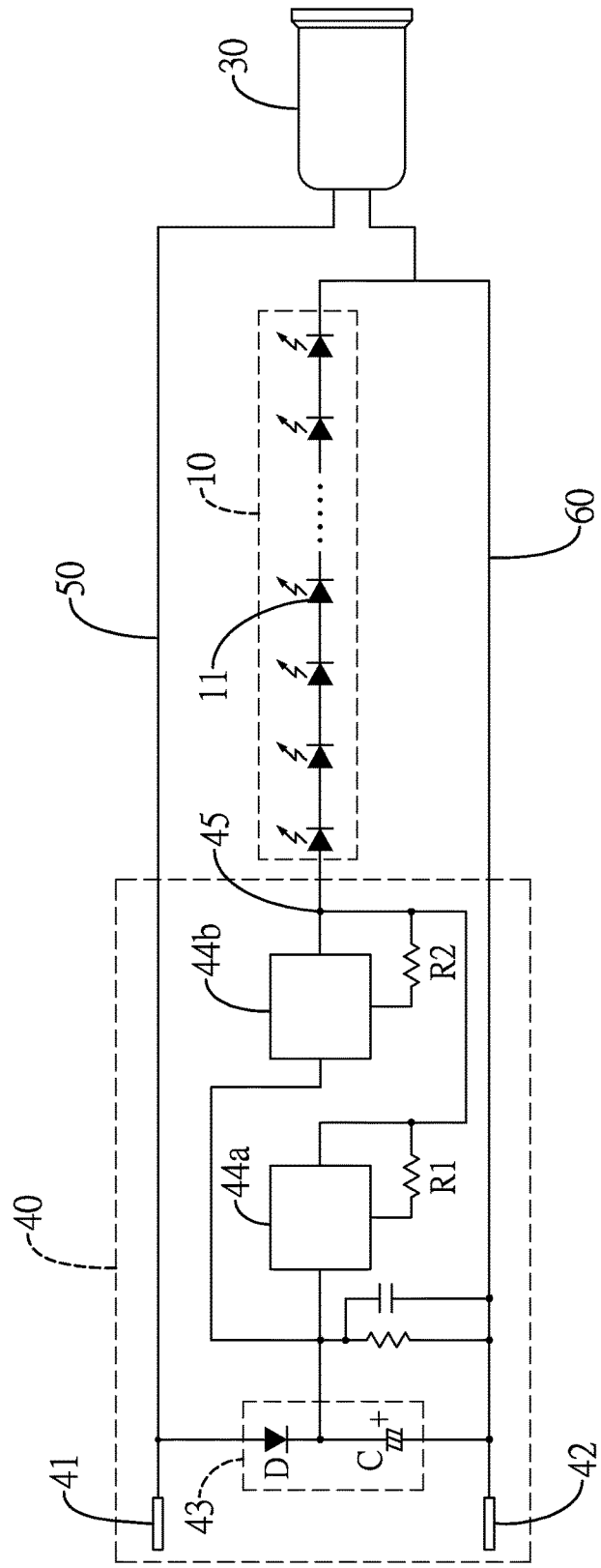
FIG. 2 is a first circuit embodiment of the LED light string of FIG. 1.

The lighting string 10 has a positive end, a negative end, and a plurality of light emitting diodes (LEDs) 11 connected between the positive end and the negative end. In one embodiment, the LEDs 11 are connected in series between the positive end and the negative end as shown in FIG. 2. In another embodiment, multiple strings of the LEDs 11 are connected in parallel between the positive end and the negative end as shown in FIG. 3. The positive end of the lighting string 10 is an anode of the first LED 11 in the lighting string 10, and the negative end of the lighting string 10 is a cathode of the last LED 11 in the lighting string 10.

The plug 20 and the socket 30 are connected to the two ends of the lighting string 10 respectively. In a first embodiment shown in FIGS. 1 to 3, the plug 20 is connected to the positive end of the lighting string 10 while the socket 30 is connected to the negative end of the lighting string 10. In a second embodiment shown in FIGS. 4 to 6, the plug 20 is connected to the negative end of the lighting string 10 while the socket 30 is connected to the positive end of the lighting string 10. The plug 20 is for connecting to an AC source or a socket of a preceding LED light string to receive AC power. The socket 30 is for connecting to a plug of a subsequent LED light string. With reference to FIG. 7, multiple LED light strings of the present invention can be sequentially connected by engaging the socket 30 of one LED light string to the plug 20 of a next LED light string to form a long ornamental light string.

Figure 4:
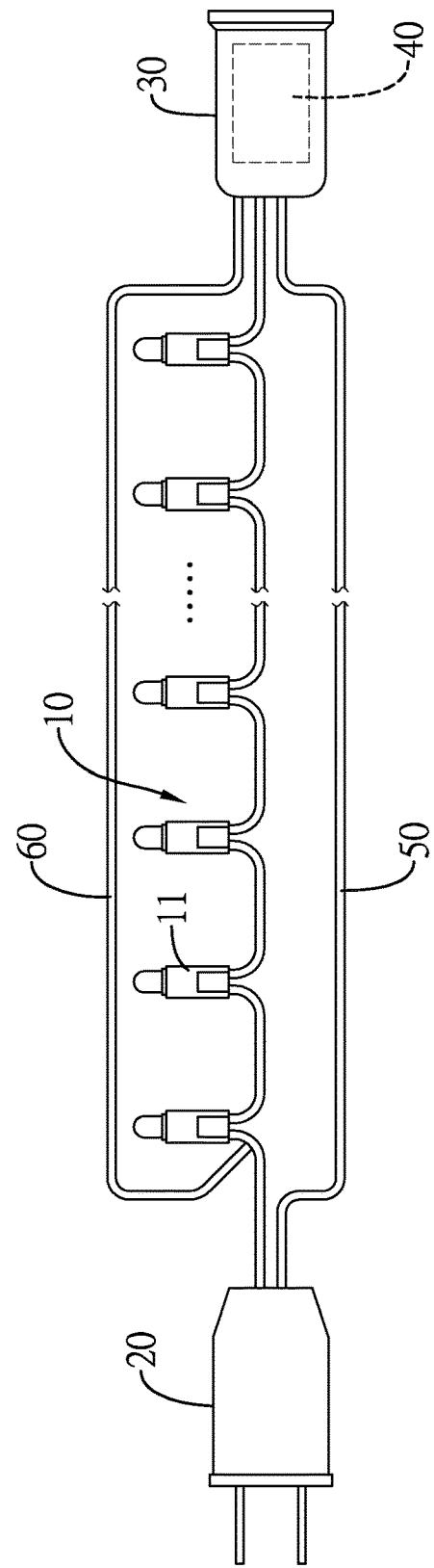
FIG. 4 is a plan view of a second embodiment of an LED light string in accordance with the present invention.
Figure 5:
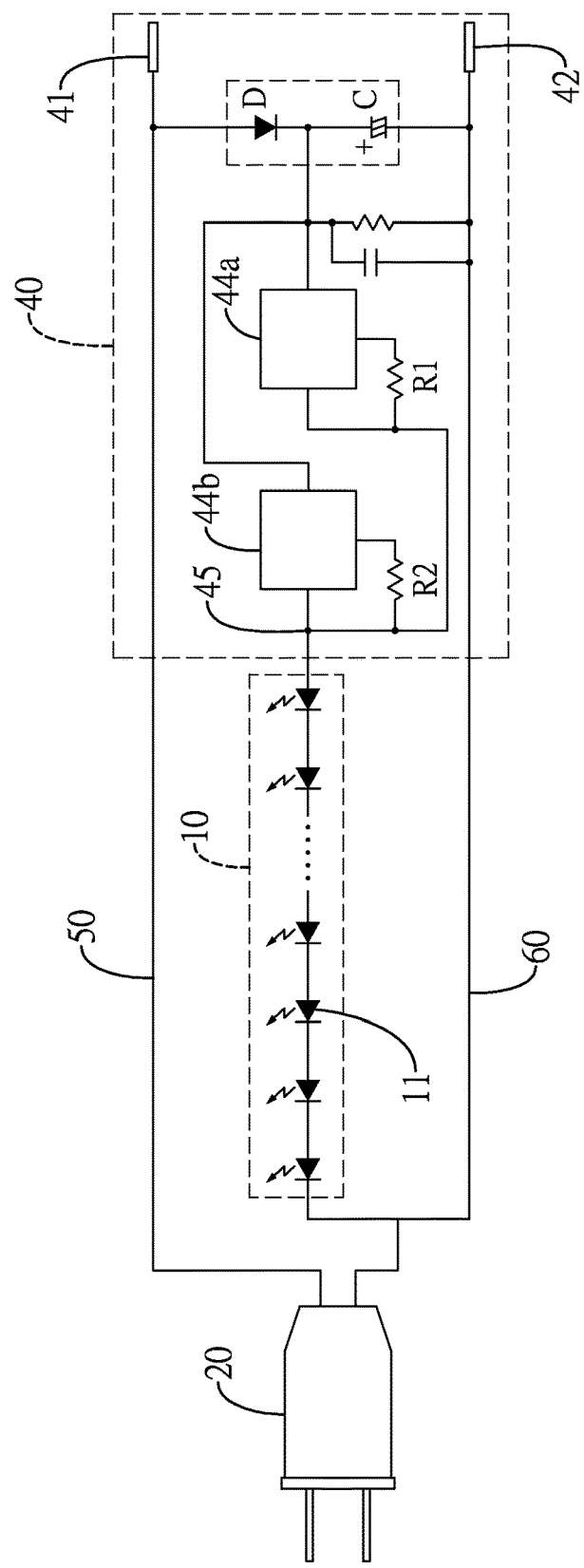
FIG. 5 is a first circuit embodiment of the LED light string of FIG. 4.
Figure 6:
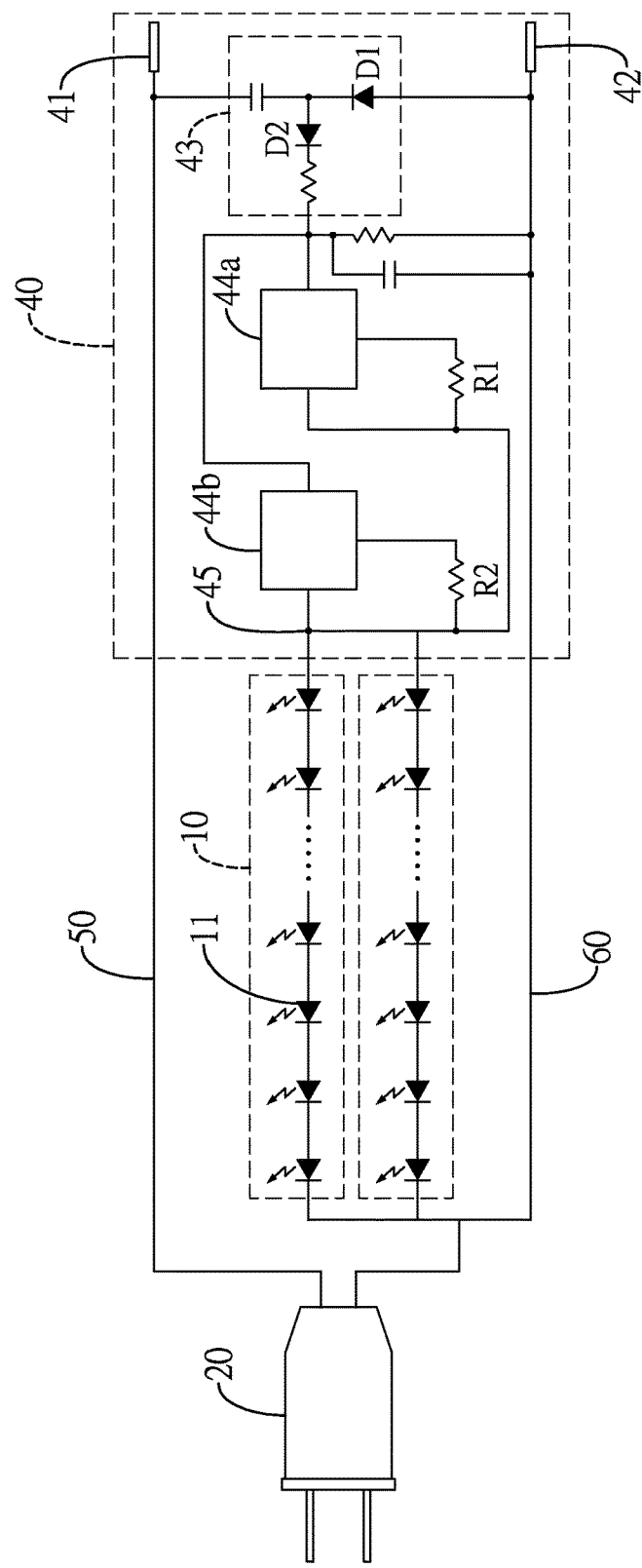
FIG. 6 is a second circuit embodiment of the LED light string of FIG. 4.
Figure 7:
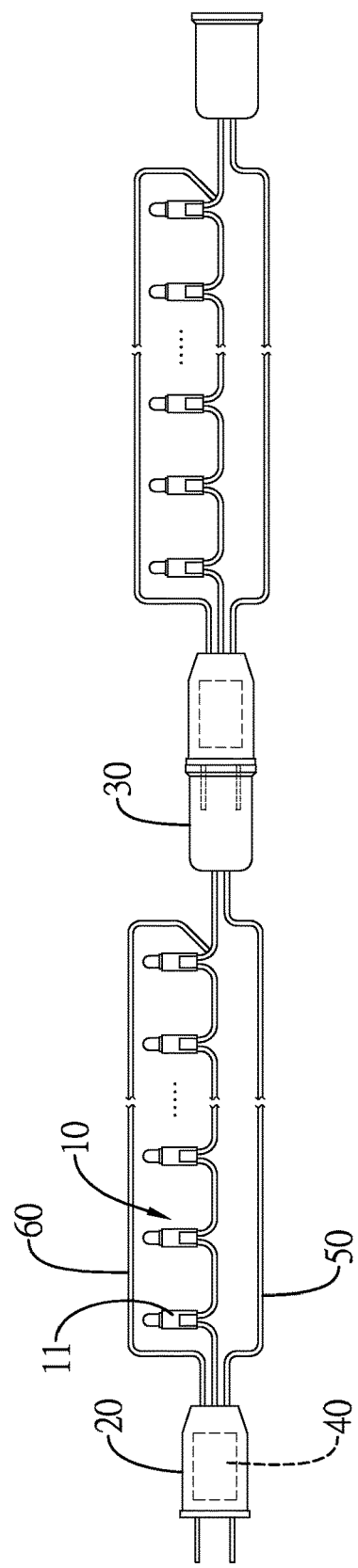
FIG. 7 is an operational view showing LED light strings sequentially connected.
Figure 8:
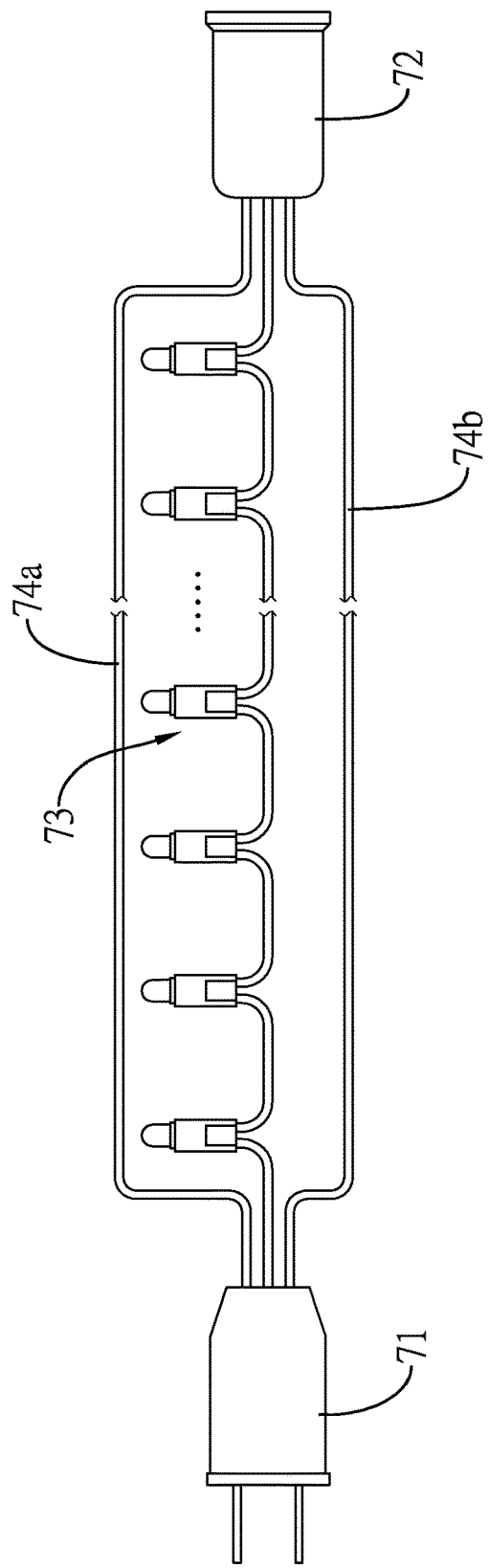
FIG. 8 is a plan view of a conventional LED light string.

With reference to FIGS. 2, 3, 5 and 6, the control circuit 40 may be provided in the plug 20 or the socket 30 and converts the AC power to a stable driving current for driving the plurality of the LEDs 11. The control circuit 40 comprises a first power terminal 41, a second power terminal 42, a power converting unit 43, and at least one current controller 44a, 44b. The AC power is received from the first power terminal 41 and the second power terminal 42 and then converted by the power converting unit 43. In one embodiment, the power converting unit 43 is a half-bridge circuit as shown in FIGS. 2, 4 and 5 to convert the AC power to a DC power output from an output node, wherein the half-bridge circuit includes a diode D and a capacitor C. In another embodiment, the power converting unit 43 comprises a first diode D1, a second diode D2, a capacitor and a resistor as shown in FIG. 3. The at least one current controller 44a, 44b receives the DC power from the power converting unit 43 and outputs a driving current.

As an example, the control circuit 40 comprises two current controllers 44a and 44b connected in parallel between the output node of the converting unit 43 and a power output end 45. The number of the current controllers 44a, 44b depends on the number of the LEDs 11. The more the current controllers 44a, 44b are used, the higher the driving current is output. In one embodiment, each of the at least one current controller 44a, 44b may be an integrated circuit (IC) and senses the status of the lighting string 10 to determine the level of the driving current so as to provide a stable current to activate the lighting string 10. For example, each of the at least one current controller 44a, 44b receives a voltage feedback signal or a current feedback signal from the lighting string 10 to obtain the status of the lighting string 10. In another embodiment, each of the at least one current controller 44a, 44b is connected to a respective resistor R1, R2. The resistors R1, R2 are used to determine the level of the driving current. Therefore, a required stable driving current can be obtained by using resistors R1, R2 of proper resistance to ensure stable illumination of each LED 11 without flickering.

Each of the at least one current controller 44a, 44b has an over-temperature protection function and an output short circuit protection. When the temperature sensed by the current controller 44a, 44b exceeds a threshold, the over-temperature protection function works to lower the driving current. In a situation where a short circuit occurs, for example, the power output end 45 is coupled to the first wire 50 or the second wire 60, the output short circuit protection will work to stop the output of the driving current.

In one embodiment, the driving current flowing through the lighting string 10 may be a certain value adjustable from 1 mA to 30 mA. A DC voltage across the lighting string 10 can be in the range from 1.5V to 170V while the AC power received is about 12V.

The first wire 50 is connected between the plug 20 and the socket 30. As shown in FIG. 2, one end of the first wire 50 is connected to the first power terminal 41 of the control circuit 40 in the plug 20, and the other end of the first wire 50 is connected to the socket 30. As shown in FIG. 4, one end of the first wire 50 is connected to the first power terminal 41 of the control circuit 40 in the socket 30, and the other end of the first wire 50 is connected to the plug 20.

The second wire 60 is electrically connected between the negative end of the lighting string 10 and the control circuit 40. As shown in FIG. 2, one end of the second wire 60 is connected to the negative end of the lighting string 10, and the other end of the second wire 60 is connected to the second power terminal 42 of the control circuit 40 in the plug 20. As shown in FIG. 4, one end of the second wire 60 is connected to the negative end of the lighting string 10, and the other end of the second wire 60 is connected to the second power terminal 42 of the control circuit 40 in the socket 30.

As shown in FIG. 1, according to the structure of the present invention, only two wires are connected to the socket 30, one is the first wire 50 and the other is the lighting string 10. Similarly, in FIG. 3, only two wires are connected to the plug 20, one is first wire 50 and the other is the lighting string 10. In comparison to either the plug or the socket of a conventional LED light string connected with three wires, the present invention can reduce the number of the wires so as to simplify the structure of the LED light string and reduce manufacturing cost.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A light emitting diode (LED) light string with stable current, comprising:

a lighting string having a positive end and a negative end, wherein the lighting string comprises a plurality of light emitting diodes electrically connected between the positive end and the negative end;

a plug and a socket, wherein the plug is connected to the positive end or the negative end of the lighting string while the socket is alternatively connected to the negative end or the positive end of the lighting string;

a control circuit provided in either the plug or the socket, the control circuit comprising:
 a power converting unit for converting an input power to a DC power; and
 a power output end connected to the positive end of the lighting string; and
 at least one current controller receiving the DC power and outputting a driving current from the power output end to the lighting string;

a first wire electrically connected between the plug and the socket; and a second wire having a first end and a second end, wherein the first end of the second wire has an electrical connection to the negative end of the lighting string and the second end of the second wire is electrically connected to the plug or the socket that has the control circuit therein.

2. The LED light string as claimed in claim 1, wherein the control circuit is provided in the plug and further comprises a first power terminal and a second power terminal for receiving the input power; and
 the first wire is electrically connected between the first power terminal and the socket, and the second wire is electrically connected between the second power terminal and the negative end of the lighting string.

3. The LED light string as claimed in claim 1, wherein the control circuit is provided in the socket and further comprises a first power terminal and a second power terminal for receiving the input power; and
 the first wire is electrically connected between the first power terminal and the plug, and the second wire is electrically connected between the second power terminal and the negative end of the lighting string.

4. The LED light string as claimed in claim 2, wherein the power converting unit comprises a half-bridge circuit, and the at least one current controller is connected between the half-bridge circuit and the power output end.

5. The LED light string as claimed in claim 3, wherein the power converting unit comprises a half-bridge circuit, and the at least one current controller is connected between the half-bridge circuit and the power output end.

6. The LED light string as claimed in claim 4, wherein the at least one current controller comprises multiple current controllers connected in parallel between the half-bridge circuit and the power output end.

7. The LED light string as claimed in claim 5, wherein the at least one current controller comprises multiple current controllers connected in parallel between the half-bridge circuit and the power output end.

8. The LED light string as claimed in claim 1, wherein the at least one current controller further connects to a resistor for determining the driving current.

9. The LED light string as claimed in claim 1, wherein the at least one current controller has an over-temperature protection function and an output short circuit protection.

10. The LED light string as claimed in claim 1, wherein the power converting unit comprises a first diode, a second diode, a capacitor and a resistor.

11. An LED light string with stable current, comprising:
a lighting string having a positive end and a negative end, wherein the lighting string comprises a plurality of light emitting diodes electrically connected between the positive end and the negative end;
a plug and a socket, wherein the plug is electrically connected to the positive end of the lighting string and the socket is electrically connected to the negative end of the lighting string;
a control circuit provided in the plug, the control circuit comprising:
  a power converting unit for converting an input power to a DC power; and
  a power output end electrically connected to the positive end of the lighting string; and
  at least one current controller receiving the DC power and outputting a driving current from the power output end;
a first wire electrically connected between the plug and the socket; and
a second wire having a first end and a second end, wherein the first end of the second wire has an electrical connection to the negative end of the lighting string and the second end of the second wire is electrically connected to the plug having the control circuit therein.

12. The LED light string as claimed in claim 11, wherein the control circuit further comprises a first power terminal and a second power terminal for receiving the input power; and
the first wire is connected between the first power terminal and the socket, and the second wire is connected between the second power terminal and the negative end of the lighting string.

13. The LED light string as claimed in claim 12, wherein the power converting unit comprises a half-bridge circuit, and the at least one current controller is connected between the half-bridge circuit and the power output end.

14. The LED light string as claimed in claim 13, wherein the at least one current controller comprises multiple current controllers connected in parallel between the half-bridge circuit and the power output end.

15. The LED light string as claimed in claim 11, wherein the at least one current controller further connects to a resistor for determining the driving current, and has an over-temperature protection function and an output short circuit protection.

16. An LED light string with stable current, comprising:
a lighting string having a positive end and a negative end, wherein the lighting string comprises a plurality of light emitting diodes electrically connected between the positive end and the negative end;
a plug and a socket, wherein the plug is electrically connected to the negative end of the lighting string and the socket is electrically connected to the positive end of the lighting string;
a control circuit provided in the socket, the control circuit comprising:
  a power converting unit for converting an input power to a DC power; and
  a power output end electrically connected to the positive end of the lighting string; and
  at least one current controller receiving the DC power and outputting a driving current from the power output end;
a first wire electrically connected between the plug and the socket; and
a second wire having a first end and a second end, wherein the first end of the second wire has an electrical connection to the negative end of the lighting string and the second end of the second wire is electrically connected to the socket having the control circuit therein.

17. The LED light string as claimed in claim 16, wherein the control circuit further comprises a first power terminal and a second power terminal for receiving the input power; and
the first wire is connected between the first power terminal and the plug, and the second wire is connected between the second power terminal and the negative end of the lighting string.

18. The LED light string as claimed in claim 17, wherein the power converting unit comprises a half-bridge circuit, and the at least one current controller is connected between the half-bridge circuit and the power output end.

19. The LED light string as claimed in claim 18, wherein the at least one current controller comprises multiple current controllers connected in parallel between the half-bridge circuit and the power output end.

20. The LED light string as claimed in claim 16, wherein the at least one current controller further connects to a resistor for determining the driving current, and has an over-temperature protection function and an output short circuit protection.

* * * * *